United States Patent
Pfeiffer et al.

(10) Patent No.: US 10,444,057 B2
(45) Date of Patent: Oct. 15, 2019

(54) DEVICE FOR DETERMINING A LEVEL OF THE SURFACE OF A FLUID IN A FLUID CONTAINER

(71) Applicant: Continental Automotive GmbH, Hannover (DE)

(72) Inventors: Karl-Friedrich Pfeiffer, Erlangen (DE); Claus Weber, Zirndorf (DE); Henning Grotevent, Nuremberg (DE); Wighard Jaeger, Spardorf (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 15/113,998

(22) PCT Filed: May 26, 2015

(86) PCT No.: PCT/EP2015/061493
§ 371 (c)(1),
(2) Date: Jul. 25, 2016

(87) PCT Pub. No.: WO2015/181105
PCT Pub. Date: Dec. 3, 2015

(65) Prior Publication Data
US 2017/0089751 A1    Mar. 30, 2017

(30) Foreign Application Priority Data
May 27, 2014 (DE) .......................... 10 2014 210 080

(51) Int. Cl.
*G01F 23/296* (2006.01)
(52) U.S. Cl.
CPC ...... *G01F 23/2962* (2013.01); *G01F 23/2968* (2013.01)

(58) Field of Classification Search
CPC .............. G01F 23/296; G01F 23/2961; G01F 23/2962; G01F 23/2968; G01F 25/0061
See application file for complete search history.

(56) References Cited

U.S. PATENT DOCUMENTS

| 4,337,661 A | * | 7/1982 | Kretz | ....................... A61B 8/00 |
| | | | | 600/440 |
| 5,095,748 A | | 3/1992 | Gregory et al. | ............ 73/290 V |

(Continued)

FOREIGN PATENT DOCUMENTS

| CN | 103097867 A | 5/2013 | ............... F01N 3/20 |
| DE | 7030851 U | 4/1971 | ........... G01F 23/296 |

(Continued)

OTHER PUBLICATIONS

U.S. Non-Final Office Action, U.S. Appl. No. 15/113,977, 21 pages, dated Sep. 14, 2017.

(Continued)

*Primary Examiner* — Justin N Olamit
(74) *Attorney, Agent, or Firm* — Slayden Grubert Beard PLLC

(57) ABSTRACT

The present disclosure relates to a device for determining a height of a fluid surface in a fluid container. In some embodiments, the device comprises: a first sound transducer and a second sound transducer for transmitting and receiving sound signals; a reference element disposed at a predetermined distance from the second sound transducer in a fluid space of the fluid container; a deflection element in the fluid space to deflect sound signals by a predetermined angle in the direction of the reference element; and a control unit. The two sound transducers are adjacent a base portion of the fluid container and aligned similarly. The control unit is configured to establish a speed of sound within a fluid in the fluid space based at least in part on travel of the second sound signals and thereby to establish the height of the fluid (Continued)

surface over the base portion of the fluid container dependent on the first sound signals and the speed of sound within the fluid.

16 Claims, 2 Drawing Sheets

(56) References Cited

U.S. PATENT DOCUMENTS

| | | | | |
|---|---|---|---|---|
| 5,693,881 | A | 12/1997 | Sitachitt et al. | 73/290 V |
| 5,793,705 | A | 8/1998 | Gazis et al. | 367/98 |
| 6,786,090 | B2 * | 9/2004 | Benghezal | G01F 23/2962 340/621 |
| 8,037,752 | B2 | 10/2011 | Zachmann et al. | 73/290 V |
| 8,943,812 | B2 | 2/2015 | Schepers et al. | 60/303 |
| 9,020,767 | B2 * | 4/2015 | Georgeson | G01F 23/303 702/55 |
| 9,605,990 | B2 * | 3/2017 | Enomoto | G01F 23/2962 |
| 10,101,193 | B2 * | 10/2018 | Pfeiffer | G01F 25/0061 |
| 2003/0140696 | A1 | 7/2003 | Benghezal et al. | 73/290 V |
| 2004/0007061 | A1 | 1/2004 | Forgue | 73/290 V |
| 2005/0284217 | A1 | 12/2005 | Miyagawa et al. | 73/290 V |
| 2010/0018309 | A1 | 1/2010 | Marcovecchio et al. | 73/290 V |
| 2012/0118059 | A1 | 5/2012 | Reimer et al. | 73/290 V |
| 2014/0345377 | A1 | 11/2014 | Jäger et al. | 73/290 V |
| 2016/0216148 | A1 | 7/2016 | Stangl et al. | 73/290 V |
| 2016/0216149 | A1 * | 7/2016 | Bauer | G01F 23/296 |
| 2016/0363473 | A1 | 12/2016 | Jung et al. | 73/628 |
| 2017/0122789 | A1 | 5/2017 | Borsoi et al. | 73/290 V |
| 2017/0363459 | A1 | 12/2017 | Kim et al. | |

FOREIGN PATENT DOCUMENTS

| | | | | |
|---|---|---|---|---|
| DE | 3706453 | A1 | 9/1988 | G01F 23/292 |
| DE | 4025326 | A1 | 11/1991 | G01F 23/296 |
| DE | 4126063 | A1 | 2/1992 | G01F 23/28 |
| DE | 102006013263 | A1 | 9/2007 | G01N 29/024 |
| DE | 102007059853 | A1 | 6/2009 | G01F 23/296 |
| DE | 102011086774 | A1 | 5/2013 | F01N 3/10 |
| DE | 102011089685 | A1 | 6/2013 | G01F 23/296 |
| DE | 102012205640 | A1 | 7/2013 | G01F 23/296 |
| EP | 2633790 | A1 | 9/2013 | A47J 37/12 |
| GB | 1300160 | A | 12/1972 | G01F 23/296 |
| JP | 4254457 | B2 | 4/2009 | B60K 15/077 |
| JP | 06160155 | A | 8/2014 | G01B 17/00 |
| WO | 2015/181105 | A1 | 12/2015 | G01F 23/296 |
| WO | 2015/181107 | A2 | 12/2015 | G01F 25/00 |
| WO | WO-2015181107 | A2 * | 12/2015 | G01F 25/0061 |

OTHER PUBLICATIONS

German Office Action, Application No. 102014210080.1, 5 pages, dated Dec. 9, 2014.
German Office Action, Application No. 102014210077.1, 5 pages, dated Feb. 5, 2015.
International Search Report and Written Opinion, Application No. PCT/EP2015/061493, 14 pages, dated Oct. 5, 2015.
International Search Report and Written Opinion, Application No. PCT/EP2015/061495, 21 pages, dated Dec. 14, 2015.
U.S. Final Office Action, U.S. Appl. No. 15/113,977, 14 pages, dated Apr. 19, 2018.
Korean Office Action, Application No. 2018026888748, 14 pages, dated Apr. 19, 2018.
Chinese Office Action, Application No. 201580006635.5, 17 pages, dated Aug. 29, 2018.
U.S. Notice of Allowance, U.S. Appl. No. 15/113,977, 18 pages, dated Jul. 11, 2018.
Korean Office Action, Application No. 2018040260074, 11 pages, dated Jun. 15, 2018.

* cited by examiner

DEVICE FOR DETERMINING A LEVEL OF THE SURFACE OF A FLUID IN A FLUID CONTAINER

CROSS-REFERENCE TO RELATED APPLICATIONS

This application is a U.S. National Stage Application of International Application No. PCT/EP2015/061493 filed May 26, 2015, which designates the United States of America, and claims priority to DE Application No. 10 2014 210 080.1 filed May 27, 2014, the contents of which are hereby incorporated by reference in their entirety.

TECHNICAL FIELD

The present disclosure relates generally to acoustic measuring devices and, more specifically, to devices for determining a level of a fluid surface in a fluid container.

BACKGROUND

Acoustic measuring devices have been used for determining a level or height of a fluid surface in a fluid container. A sound transducer of the acoustic measuring device can operate both as sound generator and as sound receiver. For the purposes of determining the height of the fluid surface in the fluid container, it is possible to emit sound pulses into the fluid to be measured by means of the sound transducer. The sound pulses are reflected by an interface of the fluid to a further medium. From the time-of-flight of the sound pulses, it is possible to draw conclusions about the height of the fluid surface in the fluid container.

SUMMARY

The present disclosure describes example devices for determining a level or height of a fluid surface in a fluid container, which enables reliable determination of the height of the fluid surface, and which can simultaneously be produced in a cost-effective and efficient manner.

In some embodiments, a device for determining a height (H) of a fluid surface (O) in a fluid container (1) may include: a first sound transducer; a second sound transducer; a reference element; a deflection element; and a control unit. The first sound transducer (10) may be for transmitting and receiving first sound signals (12, 14). The second sound transducer (20) may be for transmitting and receiving second sound signals (22, 24). The two sound transducers (10, 20) may be arranged at a base portion (3) of the fluid container (1) with the same alignment. The reference element (30, 40) may have a predetermined distance from the second sound transducer (20) and may be arranged in a fluid space (5) of the fluid container (1). The deflection element (50) may be arranged in the fluid space (5) for the purposes of deflecting the second sound signals (22, 24) by a predetermined angle (W) in the direction of the reference element (30, 40). The control unit may be configured to establish a speed of sound within a fluid (F) in the fluid space (5) dependent on the second sound signals (22, 24) and to establish the height (H) of the fluid surface (O) over the base portion (3) of the fluid container (1) dependent on the first sound signals (12, 14) and the speed of sound within the fluid (F).

In some embodiments, the base portion (3) is embodied separately from side walls of the fluid container (1).

In some embodiments, the deflection element (50) is made of metal, ceramics or glass.

In some embodiments, the deflection element (50) is embodied as a hollow body.

In some embodiments, the hollow body is filled with air.

In some embodiments, the deflection element (50) deflects the second sound signals (22, 24) by 90°.

In some embodiments, the base portion (3) of the fluid container (1) has at least one protrusion (60), which projects into the fluid space (5) and to which the deflection element (50) is mechanically coupled.

In some embodiments, the at least one protrusion (60) is embodied as a three-sided prism, the first side face of which is arranged in coplanar fashion with the base portion (3) of the fluid container (1), the second side face of which is arranged perpendicular to the base portion (3) of the fluid container (1) and the third side face of which is coupled to the deflection element (50).

In some embodiments, the at least one protrusion (60) has a groove for accommodating the deflection element (50) at a base area arranged perpendicular to the base portion (3) of the fluid container (1).

BRIEF DESCRIPTION OF THE DRAWINGS

Exemplary embodiments of the invention are explained below on the basis of the schematic drawings. In detail.

Figure 1:
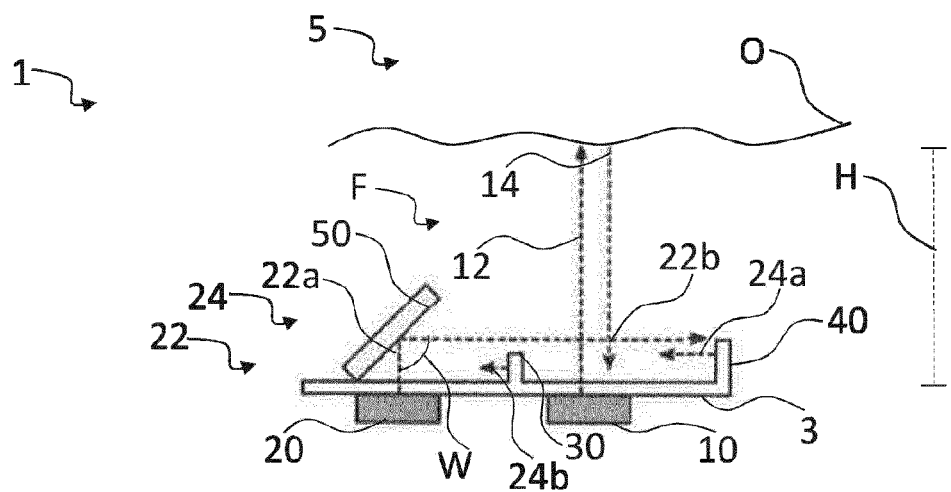
FIG. 1 shows a first exemplary embodiment of a device for determining a height of a fluid surface in a fluid container, in accordance with teachings of the present disclosure.

Elements of the same structure or function have been provided with the same reference signs in a figure-overarching manner.

DETAILED DESCRIPTION

Some embodiments may include a device comprising a first sound transducer for transmitting and receiving first sound signals and a second sound transducer for transmitting and receiving second sound signals, wherein the two sound transducers are arranged at a base portion of the fluid container with the same alignment. The device may comprise a reference element which has a predetermined distance from the second sound transducer. The reference element is arranged in a fluid space of the fluid container. The device may comprise a deflection element which is arranged in the fluid space for the purposes of deflecting the second sound signals by a predetermined angle in the direction of the one reference element and a control unit to establish a speed of sound within a fluid in the fluid space dependent on the second sound signals. Furthermore, the control unit may establish the height of the fluid surface over the base portion of the fluid container dependent on the first sound signals and the speed of sound within the fluid.

Such an arrangement of the two sound transducers enables a precise determination of the height in the case of high fill levels and low fill levels of, e.g., less than 10%. Here, a respective beam path of the two sound transducers is independent of one another, for example.

To this end, the first sound transducer emits directly in the direction of the fluid surface. Establishing the speed of sound within the fluid enables a precise establishment of a time-of-flight of the signal. In order to be able to establish the speed of sound within the fluid even in the case of low fill levels, the device may transmit and receive the second sound signals at a low height over the base portion of the fluid container. An obstruction-free, direct propagation of the first sound signals is advantageous, particularly in the case of high fill levels, to keep a loss of signal power low. As a result, a particularly large measurement range is made possible.

The arrangement of the two sound transducers in the base portion of the fluid container with the same alignment may result in only one assembly step required, contributing to a cost-effective and efficient production of the device. Furthermore, particularly in the case of installation space restrictions, it may be simpler to arrange both sound transducers at the base portion of the fluid container. By way of example, the two sound transducers are embodied as piezotransducers. An assembly of the two sound transducers is additionally made more difficult as a result of e.g. the small size thereof. The arrangement of the two sound transducers at the base portion of the fluid container may contribute to the assembly being carried out in a precise and efficient manner. Furthermore, crossing of acoustic paths from the two sound transducers leads to a particularly compact design of the device.

In some embodiments, the base portion is embodied separately from side walls of the fluid container. By way of example, this additionally contributes to a simple installation of the two sound transducers.

In some embodiments, the deflection element is made of metal, ceramics or glass. Thus, the deflection element has a high acoustic impedance relative to the fluid in the fluid container. Hence, the reliable deflection of the sound signals is made possible. Moreover, this for example enables a robust arrangement of the deflection element as a free-standing component.

In some embodiments, the deflection element is embodied as a hollow body. Should the deflection element be filled with air, a thermally caused expansion of the deflection element may be reduced. Furthermore, this reduces e.g. material costs and the weight of the device.

In some embodiments, the hollow body is filled with air. Relative to the fluid in the fluid container, the deflection element thus has a low acoustic impedance. This enables reliable deflection of the sound signals.

In some embodiments, the deflection element deflects the second sound signals by 90°. This contributes to easily determining the speed of sound.

In some embodiments, the base portion of the fluid container has at least one protrusion to which the deflection element is mechanically coupled. The protrusion projects into the fluid space. This enables a simple arrangement of the deflection element.

In some embodiments, the protrusion is embodied as a three-sided prism. The first side face of the three-sided prism is arranged in coplanar fashion with the base portion of the fluid container. The second side face of the three-sided prism is arranged perpendicular to the base portion of the fluid container and the third side face of the prism is coupled to the deflection element.

In such embodiments, this prevents air bubbles which are included in the fluid in the fluid container from reaching under the deflection element. Furthermore, this allows the air-filled deflection element, embodied as a hollow body, to be arranged in the protrusion.

In some embodiments, the at least one protrusion has a groove for accommodating the deflection element at a base area arranged perpendicular to the base portion of the fluid container. This enables a free-standing arrangement of the deflection element, as a result of which material, weight and, in particular, installation space can be saved.

FIG. 1 shows a fluid container 1 with a base portion 3 and a fluid space 5, which is filled with a fluid F. By way of example, the fluid F is a liquid medium for reducing pollutants in exhaust gases, which may have a reduction means and/or a reduction means precursor, for example an aqueous urea solution.

For determining the height H of a fluid surface O in the fluid container 1, a first sound transducer 10 and a second sound transducer 20 are arranged at the base portion 3 of the fluid container 1. Here, the height H is defined as a distance between the fluid surface O and the base portion 3, measured in a neutral position of the fluid container 1, i.e. when there is no inclined position of the fluid container 1 present and the fluid surface O is parallel to the base portion 3. The height H can also be referred to as a fill level of the fluid container 1.

By way of example, the two sound transducers 10, 20 are embodied as piezo-transducers and coupled through a housing wall of the fluid container 1. By way of example, the housing wall is made of a plastic, such as e.g. so-called high density polyethylene (HDPE) such that the base portion 3 can be welded into the housing wall. Alternatively, the two sound transducers 10, 20 are e.g. adhesively bonded to the housing wall or mechanically pressed against the latter, possibly also with a further intermediate layer for compensating unevenness or roughness.

The first sound transducer 10 comprises a transmitter which emits first sound signals 12 in the direction of the fluid surface O. Here, the first sound transducer 10 is aligned in such a way that a main emission direction of the emitted first sound signals 12 is directed perpendicular to the base portion 3 toward the fluid surface O.

The fluid space 5 above the fluid F is filled with a further medium such as e.g. air, and so the emitted first sound signals 12 are reflected at a transition between the fluid surface O and the air, and reflected first sound signals 14 are incident on the first sound transducer 10. The reflected first sound signals 14 are recorded by a receiver of the first sound transducer 10. By way of example, a single piezo-element can be used as transmitter and receiver. Here, the alignment of the first sound transducer 10 likewise leads to a substantially perpendicular propagation of the first reflected sound signals 14 in relation to the base portion 3 of the fluid container 1. The propagation of the first sound signals 12, 14 is direct such that a power drop at obstacles is prevented and a determination of high fill levels of the fluid container 1 is thus made possible.

For the purposes of precisely determining the height H of the fluid surface O in the fluid container 1, a signal propagation speed of the first sound signals 12, 14 needs to be known. It is for this reason that a reference measurement is carried out by means of the second sound transducer 20. In order to be able to carry out this reference measurement even in the case of low heights H of the fluid surface O in the fluid container 1, i.e. in the case of e.g. fill levels of less than 10% of a maximum fill level, a sound propagation of the second sound signals 22, 24 takes place near the base portion 3 of the fluid container 1 in a manner substantially parallel to the base portion 3. Analogous to the first sound transducer 10, the second sound transducer 20 comprises a transmitter, which emits second sound signals 22, and a receiver, which records reflected second sound signals 24. Crossing of acoustic paths of the sound signals 12, 14 and 22, 24 in this case leads to a particularly compact design of the device, without the sound signals 12, 14, 22, 24 being influenced in a substantial manner.

A first reference element 30 and a second reference element 40 are arranged in the fluid space 5. The two reference elements 30, 40 may be made of a material which comprises a metal. By way of example, the two reference elements 30, 40 are made from a metal piece and coupled with the base portion 3 of the fluid container 1 by staked plastic studs.

The two reference elements 30, 40 reflect at least part of the emitted second sound signal 22. The first reference element 30 has a predetermined first distance from the second sound transducer 20. The second reference element 40 has a predetermined second distance from the second sound transducer 20 and, in particular, a precisely known distance from the reference element 30. By means of a control unit (not depicted in any more detail), a time-of-flight difference between the reflected second sound signals 24 is established in a manner dependent on the known distance between the two reference elements 30, 40, and a speed of sound in the fluid F in the fluid container 1 is established dependent on the time-of-flight difference. The height H of the fluid surface O above the base portion 3 of the fluid container 1 thus can be established in a manner dependent on the speed of sound within the fluid F and the first sound signals 12, 14.

In order to design an assembly of the two sound transducers 10, 20 in a simple and cost-effective manner and in order to keep a number of required assembly steps low, the second sound transducer 20 is arranged with the same alignment to the first sound transducer 10 at the base portion 3 of the fluid container 1.

In a first stage 22a of the emitted second sound signals 22, the main emission direction thereof thus is likewise substantially perpendicular to the base portion 3 of the fluid container 1. A deflection element 50 is arranged in the fluid space 5 to ensure the sound propagation of the second sound signals 22, 24 near the base portion 3 of the fluid container 1 to be substantially parallel to the base portion 3.

The deflection element 50 includes a 45° angle with the base portion 3 of the fluid container 1 such that the second emitted sound signals 22 of the first stage 22a, which are perpendicular to the base portion 3, are deflected by the predetermined angle W, by 90°, and, in a second stage 22b, are reflected substantially parallel to the base portion 3 by the deflection element 50 in the direction of the two reference elements 30, 40. In a manner analogous thereto, second sound signals 24, which are reflected by the two reference elements 30, 40 and which run substantially parallel to the base portion 3 in a first stage 24a, are deflected by 90° in the direction of the second sound transducer 20.

By way of example, the deflection element 50 is made of a metal piece and it has a high acoustic impedance relative to the acoustic impedance of the fluid F such that a majority of the sound signals 22, 24 are reflected.

In this exemplary embodiment, the deflection element 50 has a free-standing arrangement. Two of the protrusions 60 of the base portion 3, which are not depicted in any more detail here, each have a groove which includes a 45° angle with the base portion 3. Here, the two protrusions 60 are arranged parallel to the image plane such that the deflection element 50 can be e.g. inserted into the groove. Advantageously, this saves installation space which, for example, enlarges a tank volume of the fluid space 5.

Figure 2:
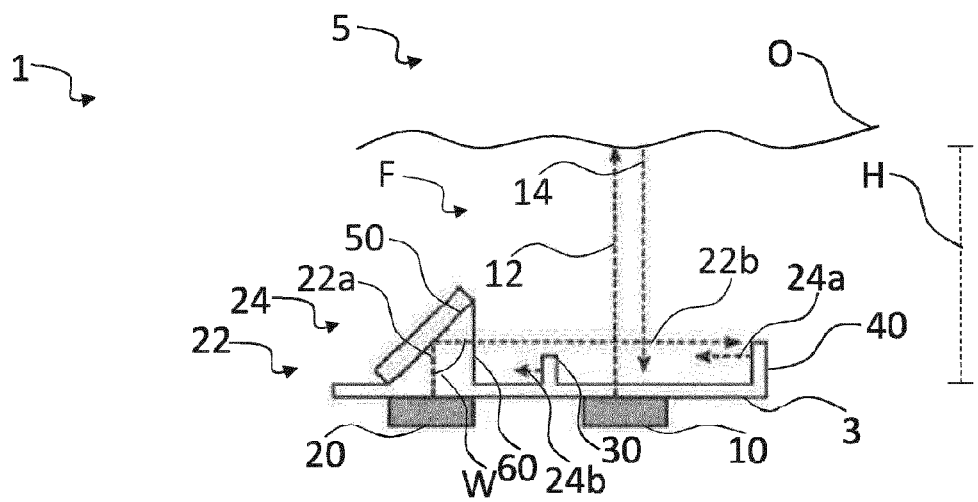
FIG. 2 shows a second exemplary embodiment of the device for determining the height of the fluid surface in the fluid container, in accordance with teachings of the present disclosure.

In a second exemplary embodiment (FIG. 2) the base portion 3 of the fluid container 1 has a single protrusion 60 for mechanical and acoustic coupling of the deflection element 50, on which protrusion the deflection element 50 lies. By way of example, the deflection element 50 is additionally mechanically fixed by way of an adhesive and/or welded connection. Alternatively, the deflection element 50 is e.g. integrated into the protrusion 60.

In this embodiment, the protrusion 60 is embodied as a three-sided prism, the first side face of which is arranged in coplanar fashion with the base portion 3. A second side face of the three-sided prism is arranged perpendicular to the base portion 3 of the fluid container 1 and a third side face of the three-sided prism includes a 45° angle with the base portion 3 such that the deflection element 50 can be coupled to the protrusion 60.

Air bubbles can be included in the fluid F in the fluid space 5 when filling the fluid container 1. In the case of a free-standing arrangement of the deflection element 50, these can be caught under the deflection element 50 and cause uncontrolled scattering of the second sound signals 22, 24. In this embodiment, this is prevented by the protrusion 60 embodied as a prism since the fluid F does not reach under the resting face of the deflection element 50.

In a third exemplary embodiment (FIG. 3), the deflection element 50 is embodied as a cavity which, for example, is filled with air. Relative to the fluid F in the fluid space 5, it has a low acoustic impedance, and so the majority of the sound signals 22, 24 are reflected. The deflection element 50 may be arranged in the protrusion 60 of the base portion 3 of the fluid container 1 such that no further component is required. By way of example, the protrusion 60 to this end comprises an air inclusion in a cavity of the protrusion 60, which is embodied as deflection element 50.

Figure 3:
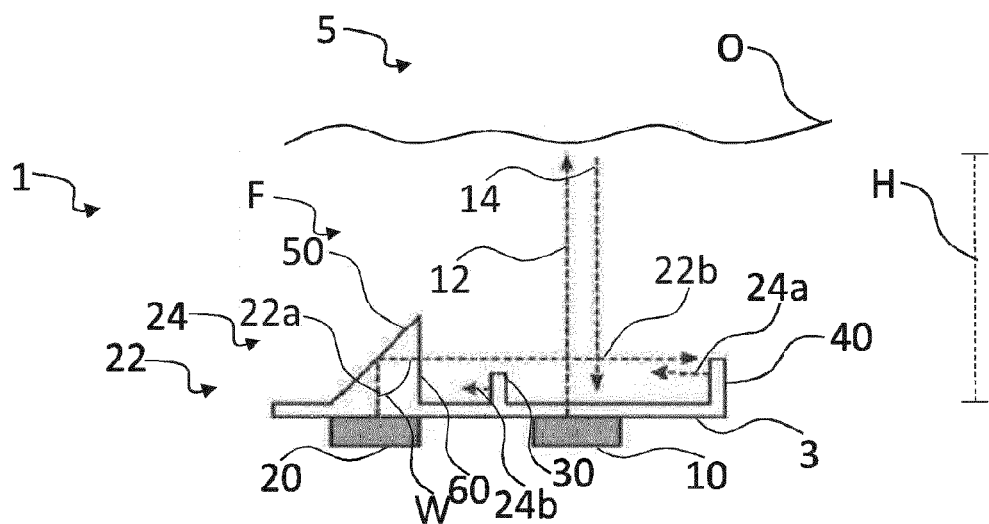
FIG. 3 shows a third exemplary embodiment of the device for determining the height of the fluid surface in the fluid container, in accordance with teachings of the present disclosure.
Figure 4:
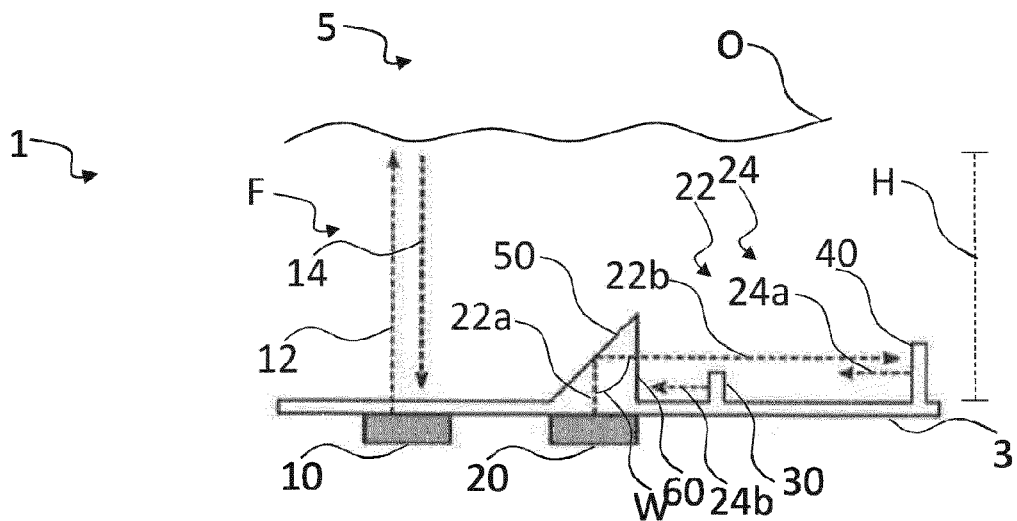
FIG. 4 shows a fourth exemplary embodiment of the device for determining the height of the fluid surface in the fluid container in accordance with teachings of the present disclosure.

In a fourth exemplary embodiment (FIG. 4), the height H of the fluid surface O of the fluid F in the fluid container 1 is determined in a manner analogous to the third exemplary embodiment from FIG. 3. In this case, the two sound transducers 10, 20 are spatially separated from one another in such a way that the first sound signals 12, 14 and the second sound signals 22, 24 propagate separately, i.e. do not cross one another.

What is claimed is:

1. A device for determining a height of a fluid surface in a fluid container, the device comprising:
   a first sound transducer for transmitting first sound signals to the fluid surface and receiving a reflected first sound signal from the fluid surface;
   a second sound transducer for transmitting and receiving second sound signals;
   the two sound transducers coupled to a base portion of the fluid container on an opposite side of the base portion from the fluid surface;
   a reference element disposed at a predetermined distance from the second sound transducer and arranged in a fluid space of the fluid container;

a deflection element arranged in the fluid space to deflect the second sound signals by a predetermined angle in the direction of the reference element; and a controller configured to calculate the height of the fluid surface over the base portion of the fluid container by multiplying a time of travel of the first sound signals and the speed of sound within the fluid based at least on a time of travel of the second sound signals transmitted by the second sound transducer, reflected by the reference element, and received back at the second sound transducer; over the predetermined distance;

wherein the base portion of the fluid container comprises a protrusion projecting into the fluid space, wherein the protrusion comprises the deflection element; and wherein the first sound transducer is arranged laterally between the second sound transducer and the reference element, such that an acoustic path of the second sound signals reflected by the reference element crosses an acoustic path of the first sound signals transmitted and received by the first sound transducer in a substantially perpendicular manner.

2. The device as claimed in claim 1, further comprising the base portion embodied separately from side walls of the fluid container.

3. The device as claimed in claim 1, wherein the deflection element comprises at least one of metal, ceramics, or glass.

4. The device as claimed in claim 1, wherein the deflection element comprises a hollow body.

5. The device as claimed in claim 4, further comprising the hollow body filled with air.

6. The device as claimed in claim 1, wherein the predetermined angle is 90°.

7. The device as claimed in claim 1, wherein the protrusion comprises a three-sided prism, having: a first side face arranged in coplanar fashion with the base portion of the fluid container, a second side face arranged perpendicular to the base portion of the fluid container, and a third side face coupled to the deflection element.

8. A method for determining a height of a fluid surface in a fluid container, the method comprising:

transmitting first sound signals from a first sound transducer through a fluid in the fluid container;

receiving the first sound signals at the first sound transducer after reflecting off the fluid surface;

transmitting second sound signals from a second sound transducer through the fluid;

deflecting the second sound signals with a deflection element arranged in the fluid space to deflect the second sound signals by a predetermined angle in the direction of a first reference element and a second reference element; and reflecting a first portion of the second sound signals back to the second sound transducer with the first reference element, which is disposed at a first predetermined distance from the second sound transducer and arranged in a fluid space of the fluid container;

reflecting a second portion of the second sound signals back to the second sound transducer with the second reference element, which is disposed at a second predetermined distance from the second sound transducer and arranged in the fluid space of the fluid container; and establishing a speed of sound within the fluid based at least in part on travel a time-of-flight difference between the first portion of the second sound signals reflected by the first reference element and the second portion of the second sound signals reflected by the second reference element and thereby to establish the height of the fluid surface over the base portion of the fluid container dependent on the first sound signals and the speed of sound within the fluid;

wherein the base portion of the fluid container comprises a protrusion projecting into the fluid space, wherein the protrusion comprises the deflection element and the two sound transducers are coupled to the base portion on an opposite side of the base portion from the fluid surface.

9. The method as claimed in claim 8, wherein the base portion of the fluid container is separate from side walls of the fluid container.

10. The method as claimed in claim 8, wherein the deflection element comprises at least one of metal, ceramics, or glass.

11. The method as claimed in claim 8, wherein the deflection element comprises a hollow body.

12. The method as claimed in claim 11, further comprising the hollow body filled with air.

13. The method as claimed in claim 8, wherein the predetermined angle is 90°.

14. The method as claimed in claim 8, wherein the protrusion comprises a three-sided prism, having: a first side face arranged in coplanar fashion with the base portion of the fluid container, a second side face arranged perpendicular to the base portion of the fluid container, and a third side face coupled to the deflection element.

15. The method as claimed in claim 8, comprising deflecting the second sound signals transmitted by the second transducer by the deflection element to deflect the first portion of the second sound signals toward the first reference element and the second portion of the second sound signals toward the second reference element.

16. The method as claimed in claim 8, wherein the base portion of the fluid container comprises a protrusion projecting into the fluid space, wherein the protrusion comprises the deflection element, and wherein the two sound transducers are coupled to the base portion on an opposite side of the base portion from the fluid surface.

* * * * *